US007149898B2

United States Patent
Marejka et al.

(10) Patent No.: US 7,149,898 B2
(45) Date of Patent: Dec. 12, 2006

(54) SELF-MONITORING AND TRENDING SERVICE SYSTEM WITH A CASCADED PIPELINE WITH ENHANCED AUTHENTICATION AND REGISTRATION

(75) Inventors: Richard Marejka, Nobleton (CA); David Haynes, Streetsville (CA)

(73) Assignee: Sun Microsystems, Inc., Palo Alto, CA (US)

( * ) Notice: Subject to any disclaimer, the term of this patent is extended or adjusted under 35 U.S.C. 154(b) by 868 days.

(21) Appl. No.: 10/184,608

(22) Filed: Jun. 27, 2002

(65) Prior Publication Data

US 2003/0135735 A1 Jul. 17, 2003

Related U.S. Application Data

(60) Provisional application No. 60/348,592, filed on Jan. 14, 2002, provisional application No. 60/377,185, filed on Apr. 30, 2002.

(51) Int. Cl.
H04L 9/00 (2006.01)
(52) U.S. Cl. .................. 713/176; 713/170; 713/171; 726/5
(58) Field of Classification Search ............... 713/176, 713/173, 185, 153
See application file for complete search history.

(56) References Cited

U.S. PATENT DOCUMENTS

| 5,539,881 A |  | 7/1996 | Hunt et al. |
| 6,070,242 A |  | 5/2000 | Wong et al. |
| 6,128,389 A | * | 10/2000 | Chan et al. .................. 380/247 |
| 6,249,814 B1 |  | 6/2001 | Shaffer et al. |
| 6,269,400 B1 |  | 7/2001 | Douglas et al. |
| 6,304,969 B1 | * | 10/2001 | Wasserman et al. ........ 713/172 |
| 6,311,208 B1 |  | 10/2001 | Miyamoto et al. |

FOREIGN PATENT DOCUMENTS

WO    WO 9636194 A1 * 11/1996

OTHER PUBLICATIONS

Forta, Ben. "Sams Teach Yoursel SQL in 10 Minutes" Sep. 17, 1999. Sams Publishing. "Understanding Advanced SQL Features".*
J. Kelsey, B. Schneier, and D. Wagner. "Key-Schedule Cryptanalysis of 3-WAY, IDEA, G-DES, RC4, SAFER, and Triple-DES" Advances in Cryptology—CRYPTO '96 Proceedings, Springer-Verlag, Aug. 1996, pp. 237-251.*
W. Diffie, M. Hellman. "New Directions in Cryptography" Nov. 1976. IEEE Transactions on Information Theory, vol. IT-22 No. 6.*

* cited by examiner

Primary Examiner—Ayaz Sheikh
Assistant Examiner—Trang Doan
(74) Attorney, Agent, or Firm—Michael C. Martensen; William J. Kubida; Hogan & Hartson LLP

(57) ABSTRACT

A registration and authentication scheme that may be used in conjunction with a computer-based system for monitoring other computer systems is disclosed. A monitored relay transmits a unique identifier to a server in the monitoring system. The server generates a random number pair, ensures the random number pair is unique, and associates the unique relay identifier with the random number pair to form an unbound key, which is registered in a database associated with the server. The unbound key is encrypted and made available to the relay. Subsequently, when the relay is instantiated it transmits the contents of the unbound key file to the monitoring system. The monitoring system decrypts the unbound key file and searches associated databases to determine whether the relay is registered and authenticates the relay.

7 Claims, 8 Drawing Sheets

SELF-MONITORING AND TRENDING SERVICE SYSTEM WITH A CASCADED PIPELINE WITH ENHANCED AUTHENTICATION AND REGISTRATION

CROSS-REFERENCE TO RELATED APPLICATIONS

This application claims the benefit of U.S. Provisional Application Nos. 60/348,592, entitled "Self-Monitoring and Trending Service System with a Cascaded Pipeline with Enhanced Authentication and Registration," filed Jan. 14, 2002, and 60/377,185, entitled "Authentication System for a Remote Service System Provided Through a Cascaded Pipeline," filed Apr. 30, 2002, the disclosures of which are specifically incorporated herein by this reference.

BACKGROUND OF THE INVENTION

1. Field of the Invention

The present invention relates in general to network monitoring, reporting, and asset tracking software systems, and more particularly to communication and authentication protocols for controlling communication in a network of client and service provider devices that utilizes a cascaded pipeline with a plurality of relays to provide a reliable store and forward mechanism with priority messaging.

2. Background

The need for effective and cost efficient monitoring and control of servers and their clients and computer network components, i.e., systems management, continues to grow at a rapid pace in all areas of commerce. There are many reasons system management solutions are adopted by companies including reducing customer and service downtime to improve customer service and staff and customer productivity, reducing computer and network costs, and reducing operating expenditures (including reducing support and maintenance staff needs). A recent computer industry study found that the average cost per hour of system downtime for companies was $90,000 with each company experiencing 9 or more hours of mission-critical system downtime per year. For these and other reasons, the market for system monitoring and management tools has increased dramatically and with this increased demand has come pressure for more effective and user-friendly tools and features.

There are a number of problems and limitations associated with existing system monitoring and management tools. Generally, these tools require that software and agents be resident on the monitored systems and network devices to collect configuration and operating data and to control communications among the monitored devices, control and monitoring consoles, and a central, remote service provider. Data collected on the monitored systems is displayed on the monitoring console or client node with tools providing alerts via visual displays, emails, and page messages upon the detection of an operating problem. While providing useful information to a client operator (e.g., self-monitoring by client personnel), these tools often require a relatively large amount of system memory and operating time (e.g., 1 to 2 percent of system or device processing time).

Additionally, many management systems are not readily scalable to allow the addition of large numbers of client or monitored systems. In many monitored networks or systems, intermediate or forwarding relays are provided between a monitoring service provider system and the monitored systems for transferring messages and data between the server and monitored systems. Presently, the forwarding relays are configured with memory and software to support a relatively small number of monitored systems, i.e., the ratio of monitored systems to relays is kept relatively small. With this arrangement, it is difficult to later add new monitored systems without modifying the hardware and/or software of the relays or without adding additional relays. Additionally, the volume of data and messages sent between monitored systems and the service provider server can vary significantly over time leading to congestion within the network and the delay or loss of important monitoring and control information.

Further, the volume of data and messages sent between monitored systems and the service provider server can vary significantly over time leading to congestion within the network and the delay or loss of important monitoring and control information. The number and size of the messages transferred between monitored systems and the service provider can be quite large to display collected data on the monitoring console or client node and to provide alerts via visual displays, emails, and page messages upon the detection of an operating problem. Data sent from a monitored system to the service provider needs to be transferred in a reliable, secure, and efficient manner.

A significant amount of effort has been spent to provide useful communication controls or protocols for managing the communication over public networks, such as the TCP/IP suite for the Internet, and these networks are typically used to link the service provider system and the customer environment or network. However, communication protocols for managing data transfers within a monitored customer environment have not been successfully developed or implemented in a computer system to meet the communication needs of both the customer and the service provider.

A communication protocol is a set of rules that governs the interaction of concurrent processes in distributed and linked systems. A communication protocol includes rules, formats, and procedures implemented between two communicating devices for initiation and termination of data exchanges, synchronization of senders and receivers, detection and correction of transmission errors, and formatting and encoding of data. Many communication protocols provide a virtual, full-duplex communication channel between similar protocol layers in linked devices. For example, the International Standards Organization (ISO) provides a seven layer protocol stack or hierarchy including, from lowest to highest layer: a physical layer, a data link layer, a network layer, a transport layer, a session layer, a presentation layer, and an application layer. Each layer in the stack defines a distinct service and implements a different protocol with higher layers building on or using the services provided by the lower layers. For example, the physical layer may implement a byte-stream protocol that includes functions or services required to transmit bits over a physical connection and defines whether the connection is copper wire, a coaxial cable, optical fiber, and the like. The data link layer uses the services of the physical layer by implementing a link-level protocol to create a reliable link adding services such as error handling and flow control. Higher layers such as the network layer (which may implement the well-known IP protocol) and the transport layer (which may implement the well-known TCP protocol) build on these two lower layers with the remaining higher layers building again on these layers.

A protocol designer may provide a new protocol for any of these layers by building on existing or known protocols, such as byte-stream protocols and the TCP/IP suite of network and transport protocols. In the customer environment of a monitoring service, there remains a need for a protocol such as a session layer protocol that coordinates and enhances communications between monitored devices, pipeline or network relays, and Internet interfaces or relays. Preferably, such a protocol defines communications between entities within a monitored customer environment in a space efficient manner that transfers monitoring service data, commands, and messages with less space or byte overhead. Also, the protocol preferably provides time efficient control with low time overhead with optional priority-based transfer of messages. Monitoring systems must also address the registration and authentication of monitored devices or systems. The registration process should, uniquely identify a monitored system (or group of systems) to the monitoring system. Further, the registration process should be secure, i.e., the process should impose a degree of privacy to the registration information exchanged between the monitoring system and the monitored system. Finally, the registration process should not be unduly burdensome to implement. Additionally, the protocol should be verifiably correct.

SUMMARY OF THE INVENTION

The present invention may be implemented in a self monitoring and trending service system that provides a scalable solution to delivering self-service solutions including system monitoring, trend reporting, asset tracking, and asset time delta reporting. The system is capable of monitoring customer environments with thousands of systems. The monitoring system preferably utilizes a cascaded pipeline architecture including linked monitored relays, forwarding relays, and Internet relays. The cascaded pipeline architecture is particularly suited for scaling from a relatively small number of clients (or customer systems or environments) up to a network having 10,000 or more systems in a customer environment to enable a single service or solution provider to effectively distribute solutions, applications, messages, and the like to the networked systems.

In the service system, monitored relays are end node systems connected to the pipeline. Forwarding relays are linked to the pipeline upstream of the monitored relays and configured to support 1 to 500 or more end node systems or monitored relays (e.g., providing a monitored system to relay ratio of 500 to 1 or larger) by forwarding and fanning out delivery of self-monitoring and other tools to customers. The Internet relays are positioned upstream of the forwarding relays and are the final point within the customer environment or network. Internet relays send messages and data to the service provider system. The pipeline of the service system implements a reliable store and forward mechanism with priority-based messaging. For example, transmission of a low-priority message may be temporarily interrupted to permit transmission of a message with higher priority.

Each of the relays includes one or more relay-to-relay interfaces that implement a protocol for controlling relay-to-relay communications. The communication protocol may utilize the services of lower layer protocols, e.g., the TCP/IP protocol suite, that provide a reliable byte-stream protocol. Messages transferred according to the protocol are formatted to include a fixed length (such as 16 bytes) header with a fixed format including a protocol field, a command field, and a length field. Information is transferred in a packet that includes a variable length field.

In another aspect, the present invention provides a method for generating a key file for authenticating a relay with a service provider system. The method comprises receiving an identifier associated with the relay; generating a registration key data set; recording the registration key data set in a database; encrypting the registration key data set; and making the encrypted registration key data set available to the relay.

In yet another aspect, the invention comprises a method for authenticating a relay with a service provider system. The method comprises receiving from a client system a relay registration message including an registration key data set associated with the relay, wherein the registration key data set includes a registration sequence number, a random number sequence and a unique client identifier; and searching a database associated with the service provider system for a matching random number sequence and client identifier. The method further comprises determining whether the registration key data set is bound to a system identifier in an authentication table associated with the service provider system; and if so, then determining whether the system identifier in the authentication table corresponds to the system identifier in a monitored system table, and if not then invoking an error routine. If the registration key is not bound to a system identifier, then the registration key is bound to an entry in the client relay authentication table.

DETAILED DESCRIPTION OF THE PREFERRED EMBODIMENTS

Figure 1:
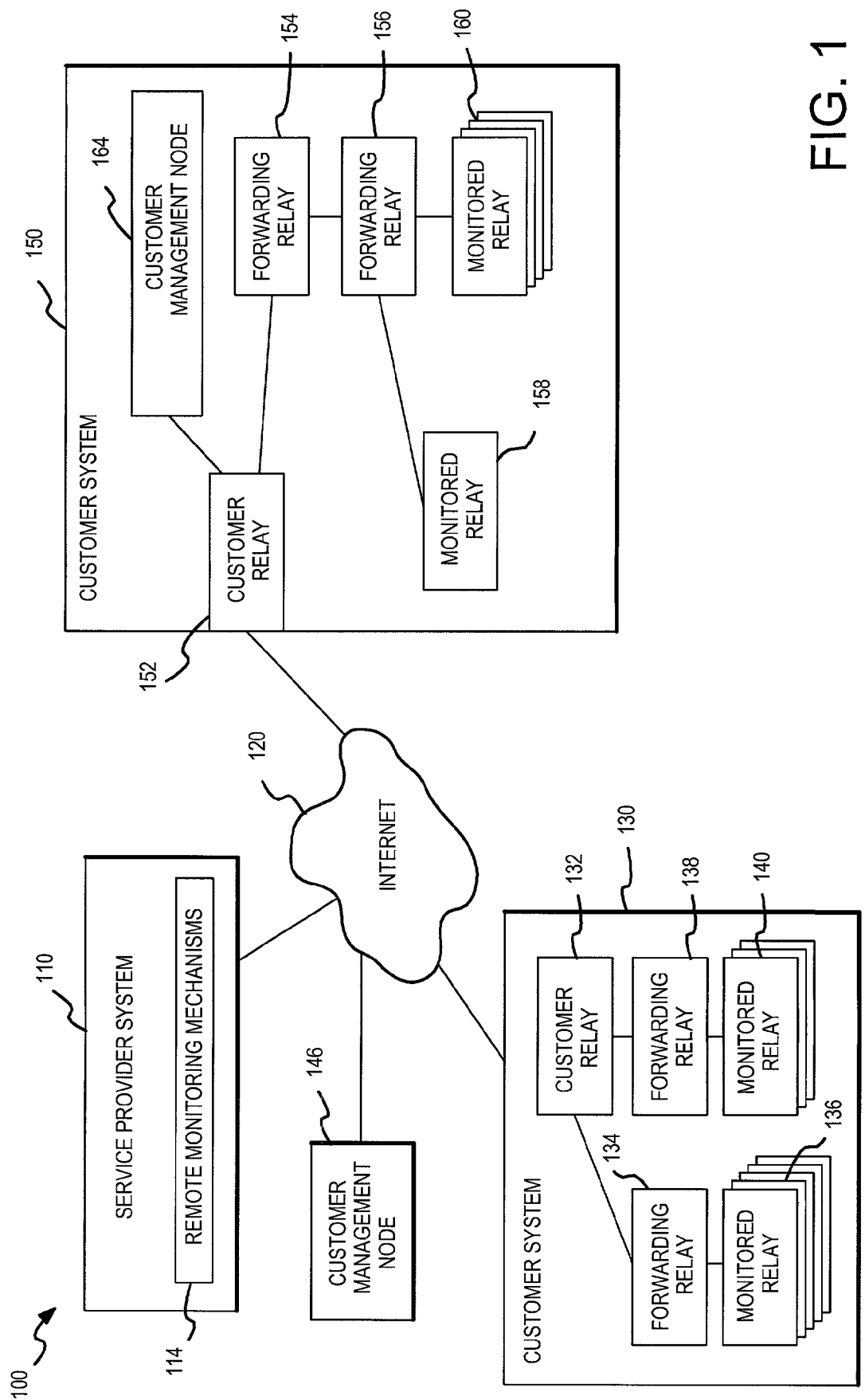
FIG. 1 is a schematic depiction of a self monitoring and trending service system in accordance with aspects of the present invention.

FIG. 1 is a schematic depiction of a self monitoring and trending service system 100 that provides scalable system monitoring, trend reporting, and asset tracking services. The system 100 includes a service provider system 110 with remote monitoring mechanisms 114 that process collected data and provide event, alert, trending, status, and other relevant monitoring data in a useable form to monitoring personnel, e.g., via customer management nodes 146, 164. The service provider system 110 may be linked to customer systems or sites 130, 150 by the Internet 120 (or any useful combination of wired or wireless digital data communication networks). The communication protocols utilized in the system 100 may vary and may include, for example, TCP/IP and SNMP. The service provider system 110 and customer systems 130, 150 (including the relays) may comprise any well-known computer and networking devices such as servers, data storage devices, routers, hubs, switches, and the like. The described features of the invention are not limited to a particular hardware configuration.

According to one aspect of the invention, service system 100 may be adapted to effect data transmissions between entities within the customer systems 130, 150, and between the service provider system 110 and the customer systems 130, 150. In this regard, system 100 may include a cascaded pipeline architecture that links customer or Internet relays 132, 152, forwarding (or intermediate or fan-out) relays 134, 138, 154, 156, and monitored relays 136, 140, 158, 160 within customer systems 130 and 150. Monitored relays 136, 140, 158, 160 are end nodes or systems being monitored in the system 100 (i.e., nodes, at which configuration, operating, status, and other data is collected). Forwarding relays 134, 138, 154, 156 are linked to the monitored relays 136, 140, 158, 160 and configured to support (or fan-out) monitored systems to forwarding relay ratios of 500 to 1 or larger. The configuration and operation of forwarding relays 134, 138, 154, 156 are described in detail with reference to FIGS. 2–4. In one embodiment, the pipeline is adapted to control the transmission of data or messages within the system and the forwarding relays store and forward received messages (from upstream and downstream portions of the pipeline) based on priorities assigned to the messages. Customer relays 132, 152 are positioned between the Internet 120 and forwarding relays 134, 138, 154 and 156, and function as an interface between the customer system 130, 150 (and, in some cases, a customer firewall) and the Internet 120. Customer relays 132, 152 may also control communication with the service provider system 110.

Referring to FIG. 1, it will be noted that multiple forwarding relays 134, 138 may be connected to a single customer relay 132 and that a single forwarding relay 134 can support a large number of monitored relays 136 (i.e., a large monitored system to forwarding relay ratio). Additionally, forwarding relays 154, 156 may be communicatively connected to provide more complex configurations and to allow additional monitored systems to be supported within a customer system 130, 150. Customer management nodes 146, 164 may be used for displaying and monitoring collected and processed system data and may be located anywhere within system 100. By way of example, customer management node 164 is located within customer system 150, while customer management node 146 is connected directly to the Internet. In practice, a single service provider system 110 may support many customer systems 130, 150, which may include many more monitored relays or systems and forwarding relays. FIG. 1 is simplified for clarity and brevity of description.

Figure 2:
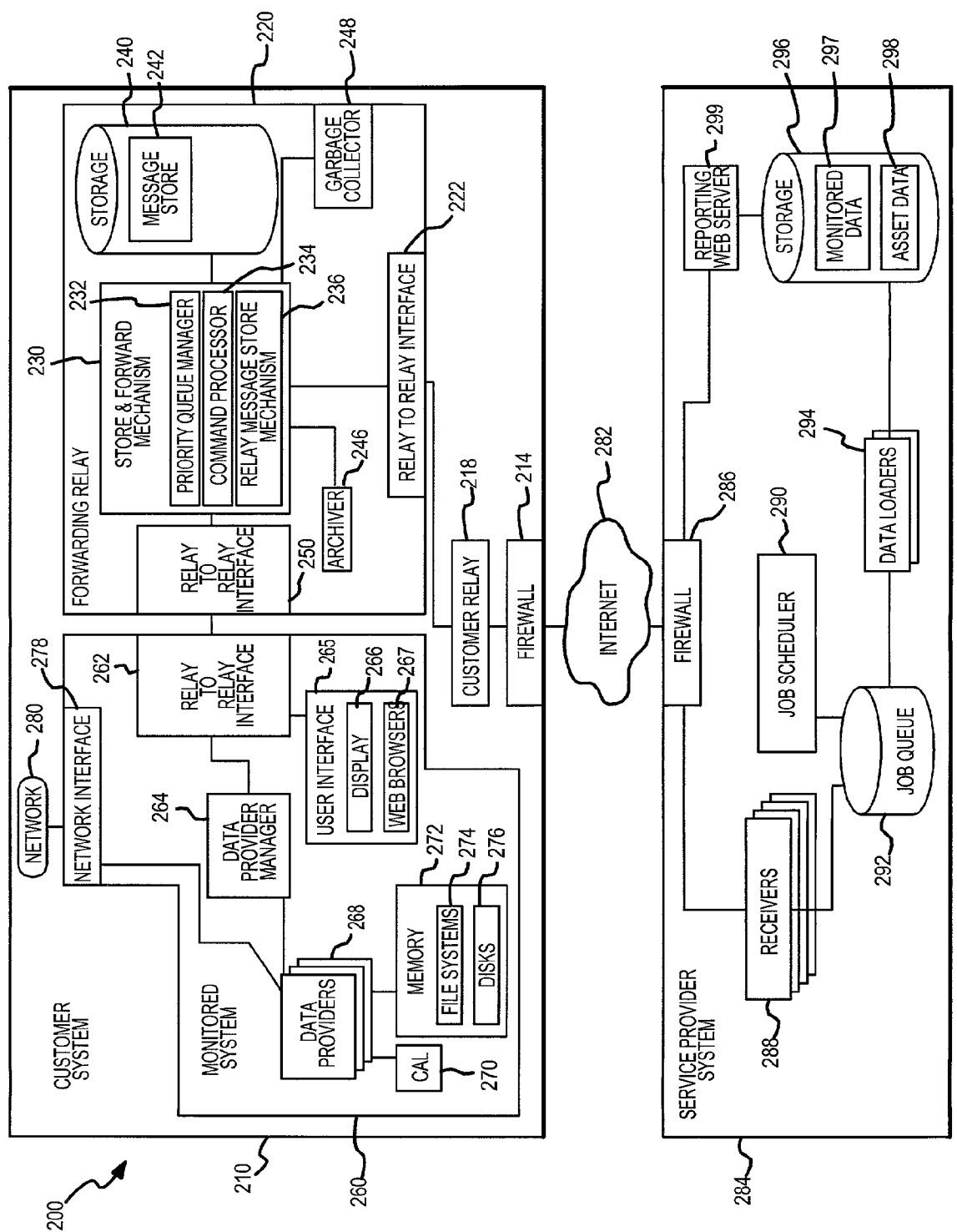
FIG. 2 is a more detailed schematic depiction of a remote monitoring service system in accordance with aspects of the present invention.

FIG. 2 is a schematic depiction of a remote monitoring service system 200 that includes a single customer system 210 linked to a service provider system 284 via a suitable communications network, e.g., the Internet 282. FIG. 2 illustrates in greater detail components within the monitored system or relay 260, the forwarding relay 220, and the service provider system 284 that cooperate to provide a high ratio of monitoring systems to relays and a unique store and forward messaging service. Customer system 210 may include a firewall 214 connected to the Internet 282 and a customer relay 218 that provides an interface to the firewall 214 and controls communications with the service provider system 284.

Customer system 210 includes a forwarding relay 220 linked to the customer relay 218 and a monitored system 260. Forwarding relay 220 accepts data from upstream sources and reliably and securely delivers the data downstream. Throughout the following discussion, the monitored system 260 will be considered the most upstream point and the service provider system 284 the most downstream point. Data (i.e., messages) flow downstream from the monitored system 260 to the service provider system 284. Forwarding relay 220 accepts data from upstream and downstream sources and reliably and securely delivers it downstream and upstream, respectively. Forwarding relay 220 caches file images and maintains a recipient list model for upstream (fan-out) propagation of such files. Forwarding relay 220 manages registration of new monitored systems and manages retransmission of data to those new systems. Forwarding relay 220 also may implement a priority scheme to facilitate efficient data flow within the system 200. Preferably, each forwarding relay 220 within a service system has a similar internal structure.

Forwarding relay 220 includes two relay-to-relay interfaces 222, 250 for receiving and transmitting messages to connected relays 218, 260. A store and forward mechanism 230 processes messages received from upstream and downstream relays and builds and transmits messages. A store and forward function is preferably provided within each relay of the system 200, and in some embodiments such message building and transmittal is priority based. To provide this functionality, the store and forward mechanism 230 includes a priority queue manager 232, a command processor 234, and a reliable message store mechanism 236, and is linked to storage 240 including a message store 242.

Briefly, priority queue manager 232 maintains an ordered list of commands and messages from upstream and downstream relays. In an exemplary embodiment, the ordered list may be indexed by date-of-arrival, or time-of-arrival of the respective commands and messages. Command processor 234 coordinates operations of the forwarding relay 220 by interpreting all command (internal) priority messages and also acts as the file cache manager, delayed transmission queue manager, and relay registry agent (as will become clear from the description of FIGS. 3 and 4). Reliable message store mechanism 236 processes received messages and commands and, in conjunction with the priority queue manager 232, builds messages from data in the message store 242 and to control transmission of these built messages. Reliable message store mechanism 236 guarantees the safety of messages transmitted within the system 200 by creating images of the messages in storage 240 (e.g., on-disk images) and implementing a commit/destroy protocol to manage the on-disk images. In general, a message represents a single unit of work that is passed between co-operating processes within system 200. Priority queue manager 232 functions to generate priority queues (which are stored in library 244). This allows relay 220 to obtain a date-ordered set of priority queues directly from the store and forward mechanism 230.

Message store 242 stores all messages or data received from upstream and downstream sources while it is being processed for transmittal as a new message. Message store 242 may take a number of forms. In one embodiment, message store 242 utilizes a UNIX file system to store message images in a hierarchical structure (e.g., as based on a monitored system or message source identifier and a message priority). The queue library implements a doubly-linked list of elements and allows insertion to both the head and tail of the list with searching being done sequentially from the head of the queue to the tail (further explanation of the "store" function of the forwarding relay 220 is provided with reference to FIGS. 3 and 4). Typically, the messages are not stored in the queue library. Instead, message descriptors are used to indicate the presence of messages in the message store 242. The queue manager 232 may create a number of queues, e.g., a queue for each priority level and extra queues for stored awaiting proper registration of receiving relays and the like. A garbage collector 248 maintains the condition of the reliable message store 242, which involves removing messages or moving messages into an archival area (not shown) with the archiver 246 based on expiry policy of the relay 220 or system 200.

In some embodiments, forwarding relay 220 and the store and forward mechanism 230 send information based upon the priority assigned (e.g., by the transmitting device such as the monitored system 260 or service provider system 284) to the message. Priorities may be assigned or adjusted based on the system of origination, the function or classification of the message, and other criteria. For example, system internal messages may be assigned the highest priority and sent immediately (i.e., never delayed or within a set time period, such as 5 minutes of posting). Alerts may be set to have the next highest priority relative to the internal messages and sent immediately or within a set time period (barring network and Internet latencies) such as 5 minutes. Nominal trend data is typically smaller in volume and given the next highest priority level. High-volume collected data such as configuration data may be given lowest priority. Of course, in practice the particular priorities assigned for messages within the system 200 may vary.

Monitored system 260 may include components to be monitored such as one or more CPUs 270, memory 272 having file systems 274 (such as storage area networks (SANs), file server systems, and the like) and disk systems 276, and a network interface 278 linked to a customer or public network 280 (such as a WAN, LAN, or other communication network). A user interface 265 may be included to permit visual and/or audible monitoring of the monitored system 260 (e.g., viewing of data collected at the monitored system 260, processed by the service provider system 284, and transmitted back via the forwarding relay 220 to the monitored system 260). The user interface 265 may include a display 266 (such as a monitor) and one or more web browsers 267 to allow viewing of screens of collected and processed data including events, alarms, status, trends, and other information useful for monitoring and evaluating operation of the monitored system 260. The Web browsers 267 provide the access point for users of the user interface 265.

Data providers 268 collect operating and other data from the monitored portions of the system 260. A data provider manager 264 controls the data providers 268, transmits messages to the forwarding relay 220, and assigns a priority to each message. Preferably, data providers 268, data provider manager 264 and relays 220, 218 consume minimal resources on the customer system 210. In one embodiment, the CPU utilization on the monitored system 260 is less than about 1 percent of the total CPU utilization and the CPU utilization on the relay system is less than about 5 percent of the total CPU utilization. Data providers 268 may collect data for a number of monitoring variables such as run queue and utilization for the CPU 270, utilization of memory 272 including information for the file systems 274 and disks 276, and collision, network errors, and deferred packets for the network interface 278. In addition to collecting monitoring variable data, data providers 268 may collect configuration data. Data providers 268 may operate on a scheduled basis such as collecting trend data (i.e., monitoring variable information) every 10 minutes, and collecting configuration data once a week or some relatively longer period of time. Data provider manager 264 coordinates collection of data by the data providers 268 and brokers the transmission of data with the relay 220.

Service provider system 284 may be linked to the Internet 282 via a firewall 286 for communicating messages with the customer relay 218 and the forwarding relay 220. Service provider system 284 may include receivers 288 which accept data transmissions from the customer system 210 and broker the data to the appropriate data loaders 294. Received messages or jobs are queued in job queue 292, which holds the complete record of the data gathered by a provider 268 until it is processed by the data loaders 294. Job scheduler 290 determines the order in which jobs are run and enables data loaders 294 to properly process incoming data. Data loaders 294 accept data from the receivers 288 and process the data into a final format stored in memory 296 as monitored data 297 and asset data 298. Data loaders 294 may be synchronized with the data providers 268 so that a particular data loader 294 is assigned to operate to load data from a particular data provider 268. Reporting web server 299 then collates gathered and processed data and transmits or reports it to the user interface 265. The types of reports may include time-based monitoring data for trend analysis, system configuration data for system discovery and planning, and time-based monitoring data evaluated against a set of performance level metrics (i.e., alerts) and may be in HTML or other format.

Figure 3:
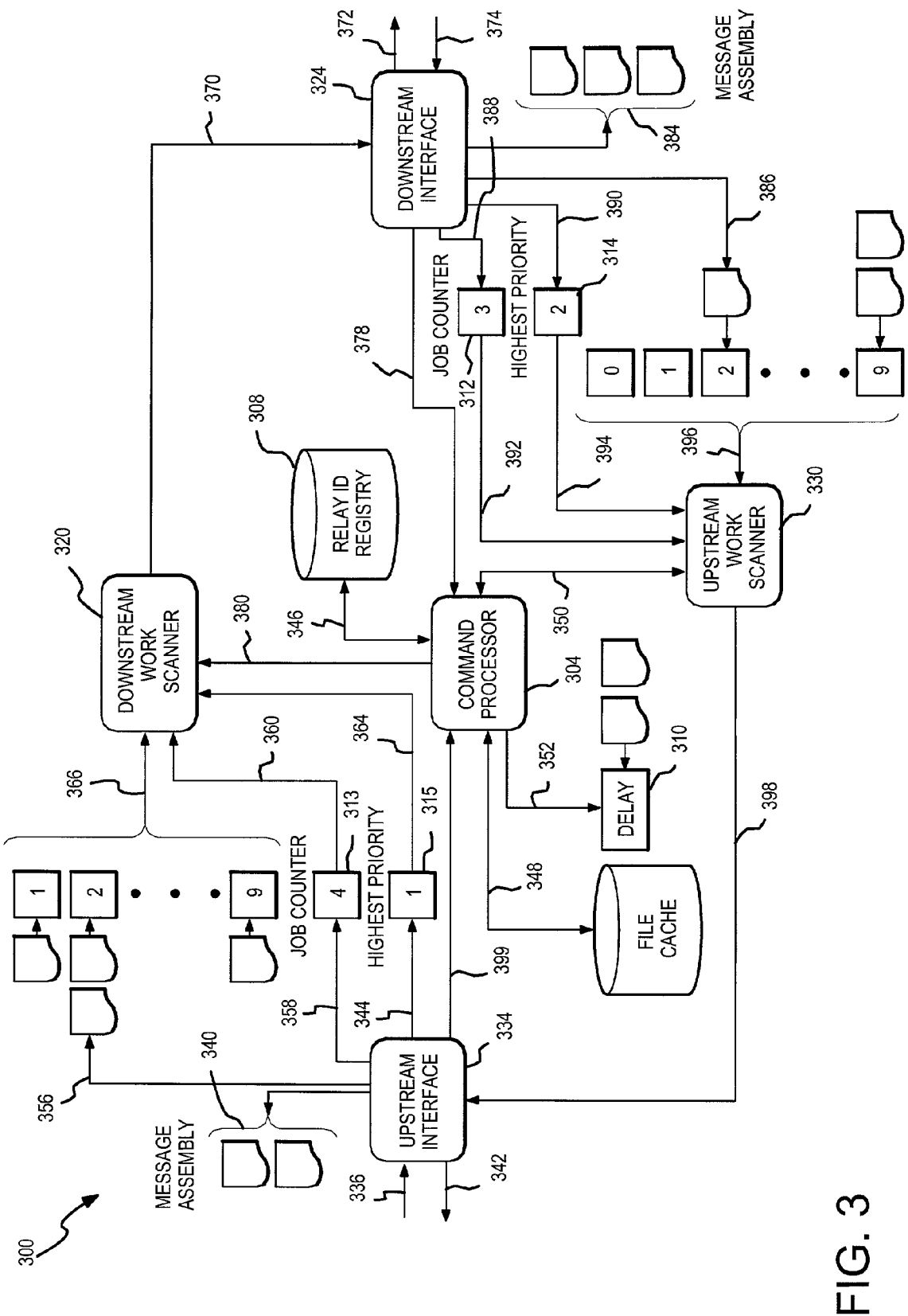
FIG. 3 is a schematic illustration of the internal structure of a forwarding relay in accordance with aspects of the present invention.

FIG. 3 is a schematic illustration of the internal structure 300 of a forwarding relay. Each relay may be connected to other relays by associating a downstream interface of one relay with the upstream relay of another. The upstream terminus of the pipeline is the data provider manager or agent, and the downstream terminus of the pipeline is the receiving agents or receivers. Relays pass command and data messages to each other. The command messages initiate certain actions on a target relay and data messages contain segments of information that are eventually assembled into files.

Referring to FIG. 3, the internal relay structure 300 includes an upstream interface 334 that coordinates all data transmissions to and from the relay 300 in the upstream direction (i.e., toward the monitored system). A message 336 arriving at the upstream interface 334 may be a command or data message. Some commands may be destined for the command processor 304, and other commands may be relevant for the upstream interface 334, i.e., "start of file" and "end of file" commands. Upon receipt of a "start of file" command the upstream interface 334 opens a file in its message assembly area 340. The start of file command has associated with it an indicator of the priority of the file being transmitted. As data segments of the same priority arrive, they are appended to the file in the file assembly area 340. When the end of file command is received, the upstream interface 334 closes the file, places the closed file on the appropriate work queue for the downstream work scanner 320, and increases the job counter 313 indicating the number of downstream jobs pending. The priority of the file being added to the downstream queues is compared to the highest priority register 315. If the new file is of higher priority, then the priority associated with the new file is written to the highest priority register 315. The upstream interface 334 also receives registration command messages that are passed to the command processor 304 and upstream acknowledgement command messages that are passed to the command processor 304 for subsequent processing. The upstream interface 334 also controls the transmission throttle for upstream communications. Transmitted data may be restricted to a desired number of bytes per unit time to avoid consuming all the available network bandwidth.

Downstream work scanner 320 determines which messages are transmitted to downstream interface 324. While the queues associated with the downstream work scanner 320 store files, the downstream work scanner 320 works with messages (with a file being composed of one message). The downstream work scanner 320 begins by examining the job counter 313. If the job counter 313 is not zero (there is work), then downstream work scanner 320 reads the value of the highest priority register 315. Downstream work 320 then obtains the next message from the highest priority work queue. Downstream work scanner 320 then sends the message to the downstream interface 324, such as by a block transmission (i.e., the downstream work scanner 320 waits for the message to be received prior to scanning for new work). Block transmissions are desirable to support throttling of the downstream interface 324. Downstream work scanner 320 also implements an acknowledgement handshake protocol with the upstream interface of the downstream relay (not shown). When the downstream relay sends an acknowledgement command on line 374, the command is sent to the command processor 304, which routes it to the downstream work scanner 320. Upon receipt of the acknowledgement command, downstream work scanner 320 releases the file from the work queues, decrements the job counter 313, and rescans the queues for the highest priority value.

The downstream interface 324 coordinates all transmissions to or from linked downstream relays (not shown). Downstream interface 324, upon receipt of a message, transmits the message to the associated downstream relay. The downstream interface 324 throttles its output by enforcing a limit on the amount of data that can be transmitted per unit of time. The throttling value may be adjusted as desired. If the data transmission rate exceeds the throttling value, then the downstream interface 324 does not read new data from the downstream work scanner 320. After sufficient time has passed to allow new transmissions, downstream interface 324 accepts the message from work scanner 320 and transmits the message 372 downstream. During message reception, downstream interface 324 accepts messages 374 from the downstream relay (not shown) destined for the relay 300 or for upstream relays (not shown). Upstream messages are routed in the same manner as the upstream interface 334 routes downstream messages, with two exceptions. First, upstream messages contain a recipient list of relay identifiers. These recipient lists have been implemented to reduce the duplication of data being transmitted to the intermediate or forwarding relays. Second, some upstream messages are command messages destined for upstream systems and have a priority of zero (highest priority) and a recipient list that includes upstream relay identifiers.

Upstream work scanner 330 determines which messages arriving at upstream interface 334 are for transmittal to upstream relays (not shown). During message transmission the upstream work scanner 330 examines the job counter 312. If job counter 312 is non-zero, then upstream work scanner 330 reads the value of the highest priority register 314. Upstream work scanner 330 then retrieves the next message from the highest priority work queue 396. The upstream work scanner 330 then sends the retrieved message to the upstream interface 334, such as by blocked transmission (i.e., by waiting for receipt of message prior to scanning for new work) to support throttling at the upstream interface 334. Upstream work scanner 330 implements an acknowledgement handshake protocol with the downstream interface of the immediate upstream relay (not shown). When an acknowledgement command is received from the upstream relay it is first sent to the command processor 304 and then routed to upstream work scanner 330. Upon receipt of the acknowledgement, upstream work scanner 330 releases the file from the work queues 396, decrements the job counter 312, and rescans the queues for the highest priority value. In some cases, it may not be possible to send a message to one or more of the upstream relays identified by the recipient list of the message. In these cases, the upstream work scanner 330 passes the message to the command processor 304 for insertion in the delay queue 310. At some future time, the command processor 304 re-inserts a delayed transmission based on the registration of a recipient relay and the upstream work scanner 330 then accepts the message from the command processor 304 and re-queues it on the appropriate priority queue.

Command processor 304 coordinates operations within the relay 300 and acts as the file cache manager, the delayed transmission queue manager, and the relay registry agent. Command processor 304 processes most command messages (with the exception of start of file and end of file command messages) within the relay 300. The most commonly processed command is the file acknowledgement command, which indicates that the upstream or downstream recipient relay has received a complete file. When a file acknowledgment command is received, command processor 304 notifies the downstream work scanner 320 or upstream work scanner 330 to release the file from the work queues.

Command processor 304 manages the file cache. In one embodiment, only the current version of any software or configuration files in relays 300 with no children are stored in file cache. The file caches of parent relays hold all the files contained in child relays (due to the hierarchical nature of the pipeline). Parents of such childless relays 300 cache the current and previous versions of any software or configuration files. Command processor 304 may be configured to manage delayed transmissions without adversely affecting other message traffic. If an upstream work scanner 330 is unable to deliver a message to a recipient, then the file associated with that message is passed to the command processor 304 for inclusion on its delayed transmission queue 310. Command processor 304 may act as a relay registry agent by making a record of the relay identifier of the registrant for storage in registry 308 when an upstream relay becomes active and sending a registration message to its downstream relay. The registration command message also includes a list of all configuration and software versions associated with the upstream relay. Command processor 304 compares this list to the list of required versions maintained in the file cache 348. Upgrades in software or configuration files are sent by the command processor 304 to the upstream work scanner 330 for insertion onto the appropriate queues. The delayed transmission queue 310 is then scanned to determine if there are any messages on the queue that are destined for the new registrant. If so, these messages are passed to the upstream work scanner 330 for insertion onto the appropriate queues.

Figure 4:
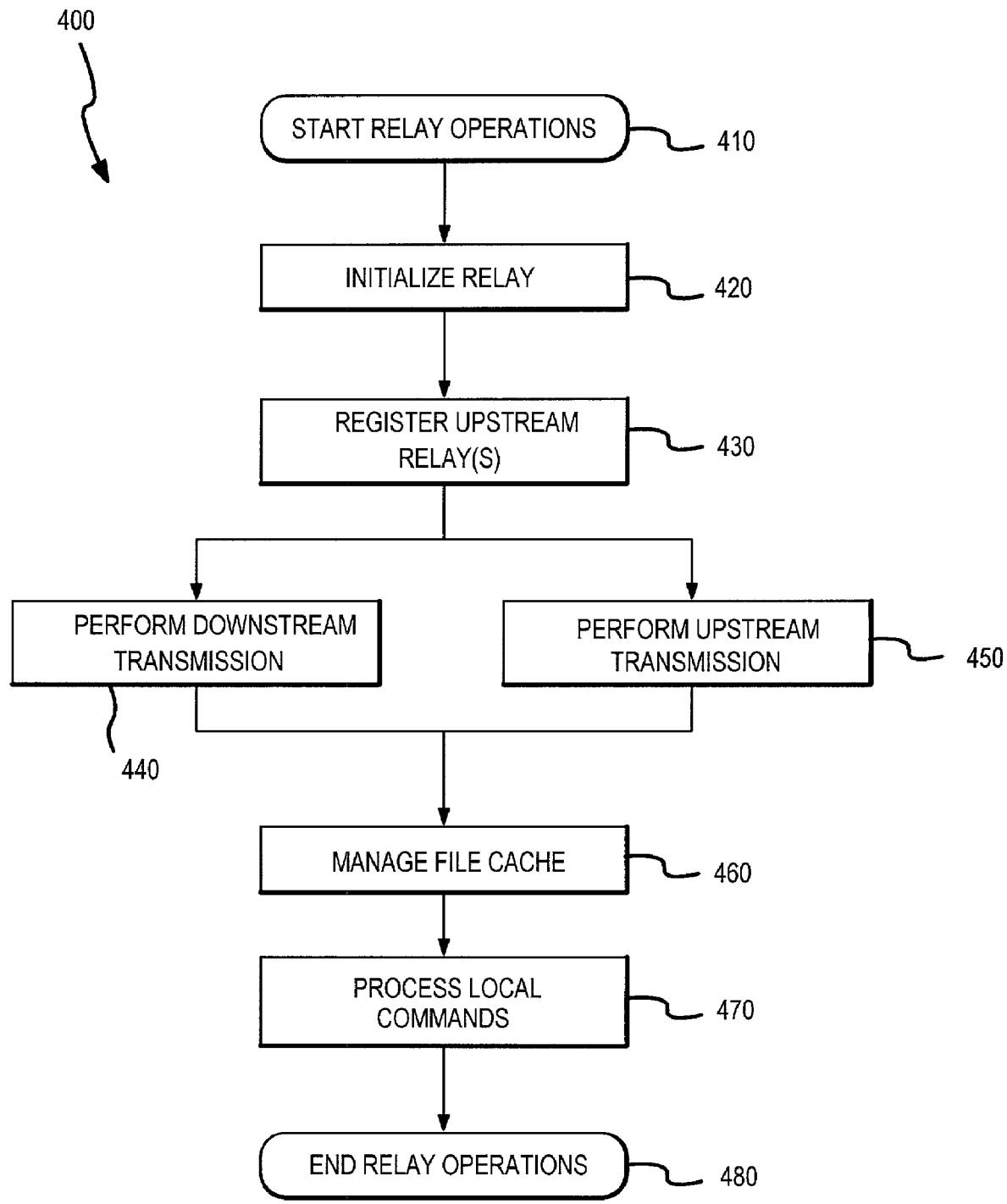
FIG. 4 is a flow chart illustrating processes performed by a forwarding relay in accordance with aspects of the present invention.

FIG. 4 is a flow chart illustrating processes performed by a forwarding relay. Referring to FIG. 4 with further reference to FIG. 3, several of the processes or functions performed by an operating forwarding relay are more fully described. At 410 relay operations begin and the relay is initialized at 420. Initialization 420 of a relay starts with the command processor 304 and continues until the relay 300 is ready to exchange data with upstream relays, and is registered with the service provider system and ready to exchange data with downstream relays. After command processor 304 is instantiated, the command processor 304 clears the relay identification registry 308. Command processor 304 then moves all files that were placed upon the delayed transmission queue 310 to the upstream file queue area. The job counters 312, 313 are then reset to zero and the highest priority registers 314, 315 are set to zero.

Initialization 420 continues with starting downstream work scanner 320 in its initialization state. In this state, downstream work scanner 320 rebuilds the downstream job queues from images on disk. Once the queues have been rebuilt, downstream work scanner 320 sets the job counter 313 and the highest priority register 315 to the appropriate values. Downstream work scanner 320 then begins to process the transmission of the highest priority file on the queues. Downstream interface 324 then starts in its initialization state, in which it issues a registration request on line 372 to the downstream relay. Upstream work scanner 330 is started in its initial state, in which it rebuilds its work queues, including those files that have been restored from the delayed transmission queue 310, and sets the job counter and the highest priority registers 312, 314 appropriately. Upstream work scanner 320 then processes the first file on the upstream work queues 396. Next, upstream interface 334 is instantiated and conditions itself to accept connections and messages from upstream relays.

For proper pipeline communications, downstream relays need to know that an upstream relay has been initialized. To support this, the downstream relay processes registration requests from upstream relays (step 430). The upstream interface 334 receives a start of file command 336 and opens a file in the file assembly area 340. As additional data messages 336 are received, they are appended to the file in the file assembly area 340. When an end of file command 336 is received, the file in the file assembly area 340 is closed and the upstream interface 334 generates an acknowledgement message 342 to the upstream relay. The command file is passed on connection 399 to the command processor 304. This file contains all the information required to register the upstream relay including a list of all configuration file versions, relay and agent versions, and provider versions.

Command processor 304 registers the relay with the relay identification registry 308. The version information supplied by the upstream relay is compared to the configuration file information in the file cache and any deviations are noted. Deviations may be corrected by transmitting the new files from the cache to the upstream work scanner 330 for insertion into the appropriate transmission queues. Command processor 304 then scans the delayed work queue 310 to determine if any files contained on the delayed work 310 are destined for this newly registered relay. If delayed transmission files are found, then they are passed to the upstream work scanner 330 for insertion onto the appropriate work queues.

Downstream transmission (step 440) encompasses the transmission of data from an upstream (customer system) source to a downstream destination (service provider system) through one or more relays. Relay 300 implements a store-and-forward mechanism as well as a priority messaging system to safely deliver data with acceptable timing. Transmission 440 begins with the upstream interface 334 receiving a start of file command on line 336. Upstream interface 334 creates a new file in file assembly area 340 to store the incoming file. Upstream interface 334 then receives a series of data messages on line 336. If the priority of the received data message matches the priority of the file 340, then the data segment of the data message is appended to this file 340. Upstream interface 334 then receives an end of file command on line 336, at which point the interface 334 closes the file 340 and issues an acknowledgement command on line 342 to the upstream relay. The completed file is then added to the end of the appropriate downstream transmission work queue and the job queue counter 313 is incremented. The priority of this new file is compared 344 to the highest priority register 315 and if the new file has a higher priority, then the highest priority register 315 is updated with the new, higher priority.

Downstream work scanner 320 then examines the job counter register 313 to determine whether there is work pending. If work is pending, then the downstream work scanner 320 obtains the value of the highest priority register 315. The file at the head of the highest priority queue is accessed, and if there is no more work on this queue, then the next queue is accessed and the highest priority register 315 is adjusted (decremented). If there is work on this queue but no open file, then a file is opened and the downstream work scanner 320 issues a start of file command. If there is an open file, then the next segment of the file is obtained by downstream work scanner 320. If there is no more data in the file, then downstream work scanner 320 closes the file and issues an end of file command and a status of "waiting for acknowledgment" is set on the file. The message containing the command or data segment is transmitted on line 370 to the downstream interface 324 (e.g., as a blocked I/O operation). Downstream interface 324 accepts the message and transmits it to the downstream relay on line 372. Once the end of file message has been transmitted, the downstream relay responds with an acknowledgment command on line 374 that is passed on line 378 to command processor 304. Command processor 304 then routes the acknowledgement to downstream work scanner 320 that removes the file from the downstream queues. Scanner 320 also decrements job counter 313 to reflect completion of the transmission 440.

Upstream transmission deals with the transfer of data from a downstream source to an upstream relay and is similar to downstream transmissions except that upstream messages include lists of recipient systems. Preferably, relay 300 is configured to continue to make efforts to deliver the file to each of the systems on the list and to forward command files to upstream relays (even when not yet registered). Upstream transmission begins with the downstream interface 324 receiving on line 374 a start of file command. The downstream interface 324 responds by creating a new file in the file assembly area 384 to store the incoming file. The downstream interface 324 then receives a series of data messages on line 374 and if the priority of the received data messages matches the priority of this file, then the data segment of the received data message is appended to this file. The downstream interface 324 then receives an end of file command 374, closes the file 384, and issues an acknowledgement command on line 372 to the downstream relay.

The complete file is added to the end of the appropriate upstream transmission work queue and commands destined for upstream relays are also queued. The job queue counter 312 is incremented and the priority of the new file is compared to the highest priority register 314. If the new file has a higher priority than the highest priority register 314, then the highest priority register 314 is updated with the new, higher priority. Upstream work scanner 330 examines the job counter register 312 to determine whether there is work pending and if so, then the scanner 330 obtains the value of the highest priority register 314. The file at the head of the highest priority queue is accessed and if there is no more work on this queue, then the next queue is accessed and the highest priority register 314 is adjusted. If there is work on this queue but no open file, then the file is opened and the upstream work scanner 330 issues a start of file command. If there is an open file, then the next segment of the file is obtained by the scanner 330. If there is no more data in the file, then the scanner 330 closes the file and issues an end of file command and a status of "waiting for acknowledgement" is set on the file.

The message containing a command or data segment is transmitted on line 398 to the upstream interface 334 (e.g., using a blocked I/O operation). Upstream interface 334 accepts the message and transmits it on line 342 to the upstream relay. If upstream interface 334 is unable to contact the recipient, then upstream work scanner 330 is notified of the failure and the recipient is marked as "unavailable" on the recipient list. Once the end of file message has been transmitted on line 342, the upstream relay responds with an acknowledgement command on line 336, which is passed on line 399 to command processor 304. Command processor 304 then routes the acknowledgement on line 350 to upstream work scanner 330, which repeats transmission steps until all recipients have been sent the file. If all recipients have received the file, then the upstream scanner 330 removes the file from the upstream queues and decrements the job counter 312 to reflect the completion of the transmission. If any message is not delivered by the upstream interface 334, then a copy of the file is sent on line 350 to the command processor 304 which stores the file 352 in the delayed transmission queue 310.

The relays perform file cache management at 460, which allows for the remote management of each relay's file cache. The relay has a file cache to minimize the number of transmissions that must traverse the entire pipeline. Downstream interface 324 receives a command message on line 374 from the downstream relay indicating the start of a cached file. The interface accepts the transmission and rebuilds the file image in the file assembly area 284. Upon receipt of the end of file command on line 374, the downstream interface 324 sends an acknowledgment command on line 372 to the downstream relay. Downstream interface 324 then passes the command on line 378 to the command processor 304, which interprets the command and takes the appropriate actions upon the cache file, such as adding the file to the cache, removing a file from the cache, returning a list of the file cache contents, and the like. Any responses generated by the command processor 304 are sent on line 380 to the downstream work scanner 320 for further processing.

The forwarding relays also process local commands at 470 that are command messages addressed to the local or receiving relay. Downstream interface 324 receives a start of command message on line 374 and opens a file in the file assembly area 384 to hold it. Subsequent data messages are appended to the open file until an end of file command message is received on line 374. Then the downstream interface 324 generates an acknowledgement message for the command file on line 372. The command file is then passed on line 378 to the command processor 304 for processing. Any responses generated by the command processor 304 for transmittal to the downstream relay or message source are passed on line 380 to the downstream work scanner 320 for further processing. The relay operations 400 are then ended at 480.

In another aspect, the forwarding relays and receivers implement procedures to support priority messaging. Files containing data to be sent upstream or downstream are added to the end of FIFO queues. An appropriate FIFO queue is selected based upon the priority assigned (by the sending device based on the corresponding process) to the file. In one embodiment, processes may be assigned a range of priorities spanning the priority value range (such as 1–9 with 1 being the highest priority and 9 the lowest). A special priority of zero may be reserved for use with control messages. The work scanners (or scanner processes) start looking at the FIFO queues beginning with the priority indicated in the highest priority register (or alternatively by starting each time with the highest priority FIFO queue, i.e., the zero priority queue). If a file is found, a segment or message of the file is sent to the appropriate relay interface. The work scanner then goes to the highest priority register (or directly to the appropriate queue) to determine which is presently the highest priority message to be sent. This priority messaging design allows higher priority work and messages to be processed as soon as it is received at the relay (e.g., within the next work cycle of the work scanner) and allows for the gradual transfer of lower priority, larger files that otherwise may block the pipeline (delay high priority messages).

The receiver coordinates the reassembly of the segments or messages into a copy of the originally sent file. Similar to the forwarding relay, the receiver manages a set of priority elements but generally only has one file open for any particular priority. The receiver listens to transmissions from the pipeline and examines the priority of segments received. If there is no file associated with a segment's priority, then the receiver creates a new file and adds the segment as the first element of the file. If a file already exists for the priority level, then the receiver simply appends the segment to the end of the existing file. When an end of file message is received, the receiver closes the file for that priority and places the information in the job queue to indicate that the file is available for subsequent processing.

In another aspect, the present invention provides a communication protocol and communication method for use in a customer environment during self-monitoring services that monitor operation history and status regarding the customer computer systems and networks. The protocol is a relay-to-relay or sender-to-receiver protocol that controls transmission of messages (including collected monitoring and asset data, internal commands, and alerts) in the customer network or pipeline in a verifiably correct manner that is both space efficient (i.e., transfers messages with minimal space or byte overhead) and time efficient. In a preferred embodiment, the messaging is priority-based with the protocol transferring higher priority (or higher value) messages before lower priority messages and providing for, in some cases, interrupts of lower priority messages with the lower priority message transmittal being resumed at the interruption point (not restarted). The protocol is built on reliable lower level protocols, such as reliable physical layer, data link layer, and network and transport layer protocols (that may or may not include the TCP/IP protocol suite). Briefly, the communication or pipeline protocol provides for messages having fixed length headers including protocol, command, and length fields and variable length data fields with a length and data format defined by the length and command fields of the header. In one embodiment, replies or acknowledgments are provided for each transmitted command except for a shutdown command and for message segment commands, which results in a large saving in required messaging or commands that need to be sent to provide effective and reliable error and flow control between relays.

In the following description, a service system is provided that implements the communication protocol that includes forwarding or fan-out relays within the customer system. The forwarding relays are configured to provide a cascaded pipeline that controls the transmission of data and/or messages between a monitored relay or system and a service provider system and allows the customer system to be readily scaled up and down in size to include hundreds or thousands of monitored systems and nodes. As will become clear from the following description, the forwarding relays and monitored relays (as well as the Internet or customer relays) include relay-to-relay interfaces and other mechanisms that implement the communication protocol and provide a store and forward mechanism that functions to provide reliable messaging based on a messaging protocol and in preferred embodiments, transmits received messages based on a priority scheme that facilitates effective and timely communication of messages and data based on assigned priorities (e.g., priorities assigned by transmitting devices such as the monitored systems or relays and the service provider system).

Figure 5:
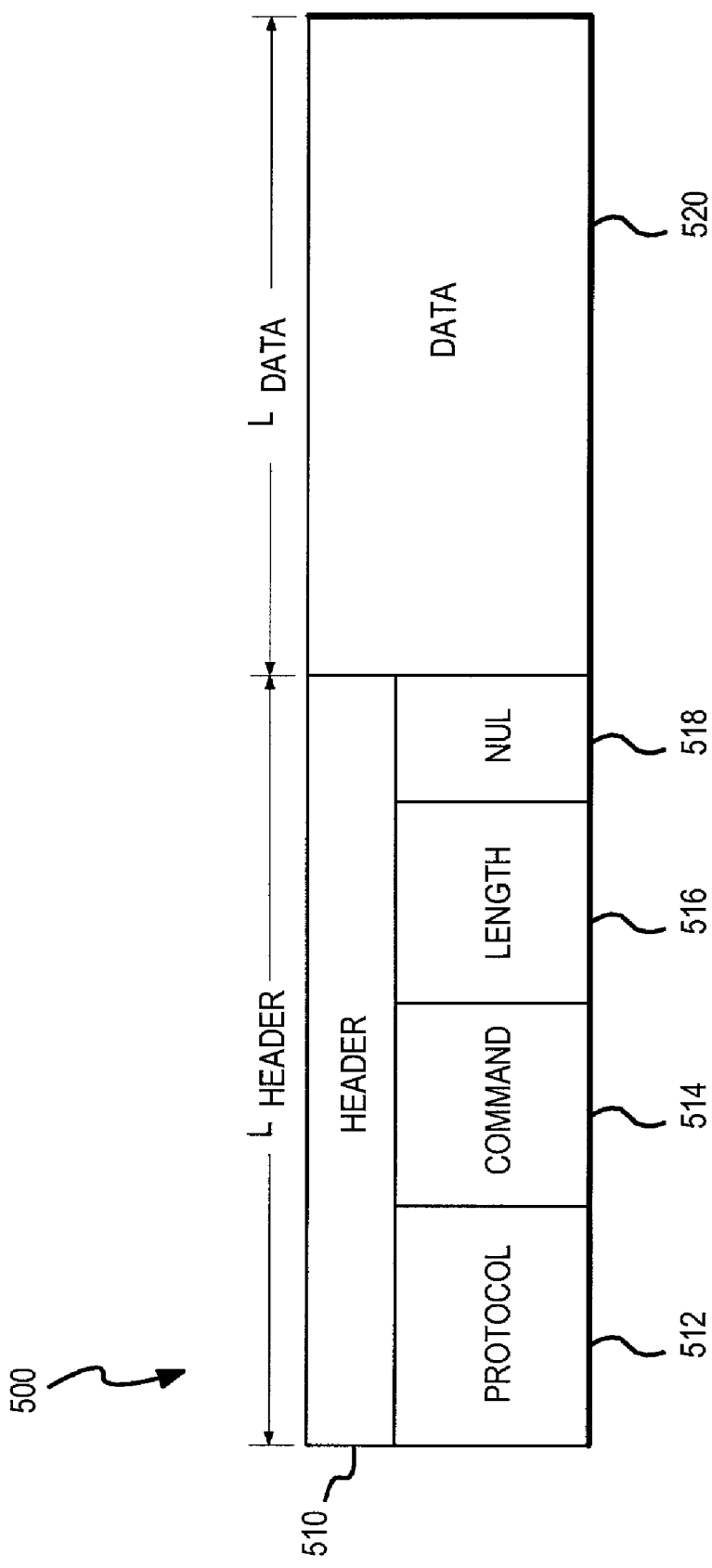
FIG. 5 is a schematic depiction of an exemplary data packet employed in the transfer of information between relays in a remote monitoring system in accordance with aspects of the present invention.

FIG. 5 is a schematic depiction of an exemplary data packet employed in the transfer of information between relays in a remote monitoring system in accordance with aspects of the present invention. Referring to FIG. 5, the pipeline protocol is based on a number of design elements or features that provide for time and space efficient and verifiable communication between relays. A message 500 formatted according to the protocol of the invention that is transmitted between relays is illustrated including a header 510 and a data section 520. The message 500 preferably is formatted to improve the ease of programming and to be verifiable. The header 510 has a fixed-length ($L_{HEADER}$), such as 16 bytes or some other useful fixed length. The 16-byte embodiment is useful for providing a space efficient header, i.e., about 1.1 percent of a standard TCP segment. The header 510 is preferably also a fixed-format header including a protocol field 512 (e.g., identifying the message as a protocol-formatted message such as five byte protocol ID of '{"0""0""0""1'), a command field 514, a length field 516, and NUL field 518.

The command field 514 identifies the type of message for processing and is preferably a command selected from a defined and limited set of commands. The command field 514 may also be a 4-byte field, such as 4 ASCII hexadecimal characters, containing a command. In one embodiment, the command set includes a relay identification command (RID), a relay identification acknowledgement command (RIDack), a start of message command (SOM), a start of message acknowledgment command (SOMack), a message segment command (MSGSEG), an end of message command (EOM), an end of message acknowledgment command (EOMack), and a shutdown or termination of connection command (SHUTDOWN). Each of these commands has an associated data content and format (i.e., data type) for data field 520. For example, the RID command data format is a relay ID, the RIDack command data format is a status along with the corresponding relay ID (and may be a negative acknowledgment), the SOM command data provides a message number or identifier along with priority and size, the SOMack command data type is status, the MSGSEG command is associated with a number of bytes with the length, $L_{DATA}$, being within a preset range such as 0 to 1444 bytes such that the overall message length with a 16 byte header is 1460 or the length of a standard TCP segment), the EOM command has message number, priority, and save data types, the EOMack command has a status data type, and the SHUTDOWN command typically has no associated data type.

Each of the data types or formats is preferably well defined in a manner that facilitates proper processing within the relays. The following data type definitions are one exemplary combination of definitions that has proven useful in the protocol. The relay ID data type includes a relay identifier (such as an ASCII string). The status data type includes a system error number value defined to provide positive or negative acknowledgment of receipt of a message (such as an ASCII decimal integer). The message number data type includes a message identifier or number (such as an ASCII decimal integer). The priority data type typically provides the message priority (such as an ASCII decimal integer in the priority range, e.g., 0 to 9 or 0 to 3). The size data type provides the message size in bytes (such as an ASCII decimal integer indicating 1 byte to 4 gigabytes). The save data type provides the save state for the sent message (such as an ASCII decimal integer, e.g., 0 indicating that the message should not be saved and 1 indicating the corresponding message should be saved).

Figure 6:
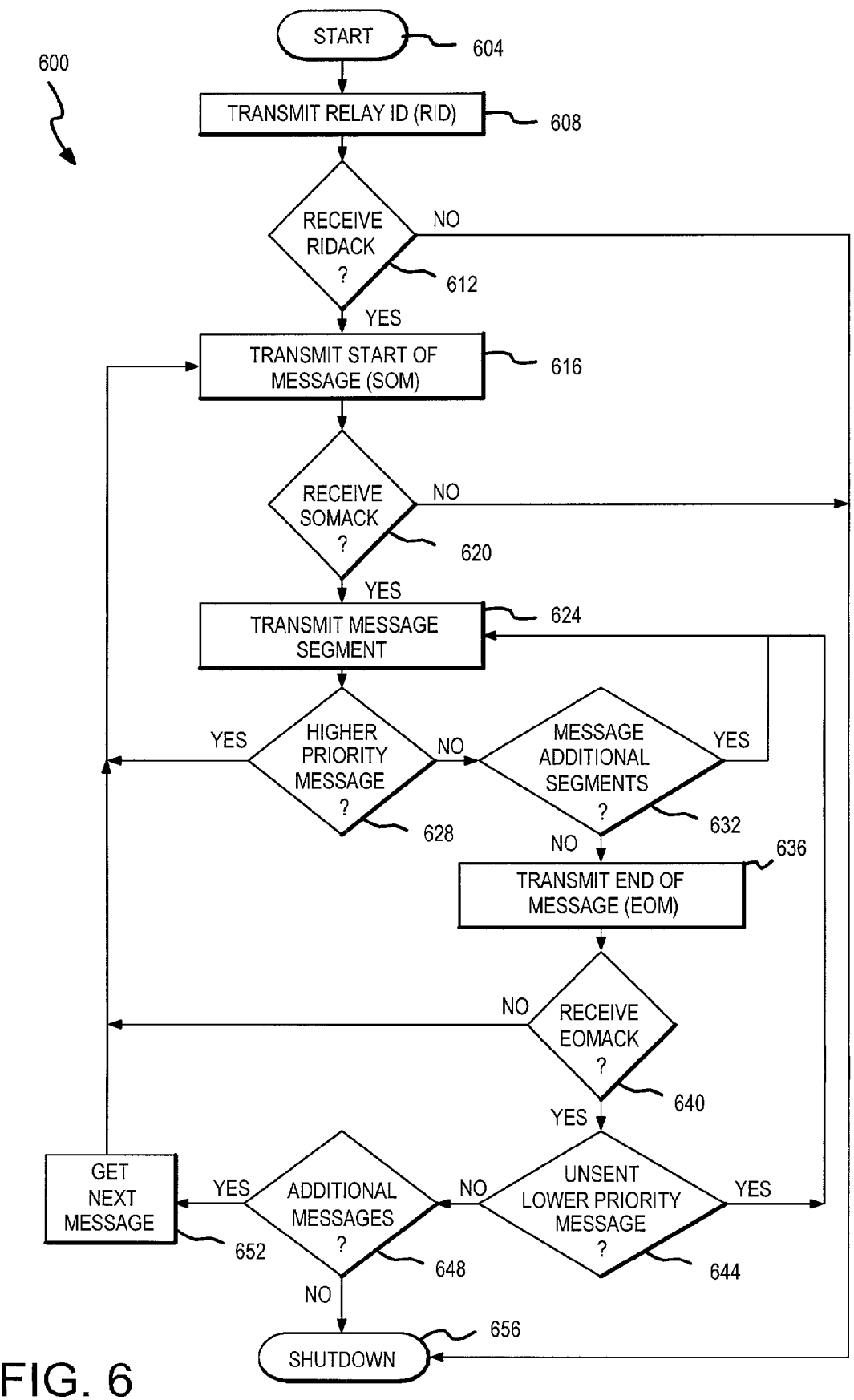
FIG. 6 is a flow chart illustrating message transmission processes at the sending device or relay according to the protocol of the invention.

With the format and content of a typical message 500 understood, transmission of messages under the communication protocol is more fully described with reference to FIG. 6 as communications would occur between two relays in a system, such as system 100 or 200. The transmission process 600 is useful for describing the protocol states involved in sending messages within a customer environment. A portion of the receiving protocol states or receiver actions are discussed with reference to FIG. 6 with additional states and defined responses provided in more detail after the discussion of the transmission process 600. The transmission process 600 starts at 604 (and prior to starting relays are registered as described above, communication links established, and software or mechanisms downloaded as shown for forwarding relay 220 of FIG. 2).

At 608, transmissions continue with transmitting a relay ID message (RID) to the receiver including an identifier for the sender or transmitting relay. The receiver determines if the sender is registered to use the channel and if appropriate transmits a RIDack message to the sending relay. At 612, the sending relay waits for a preset period for the RIDack message in response to the sent RID message and if it is not received the connection is terminated at 656 without a message being transmitted. If a RIDack is received at 612, then the message transmission phase begins at 616 with the sending relay transmitting a start of message (SOM) message to the receiver. Flow control may be provided by the sending relay, which expects and waits for an acknowledgment of the SOM message. At 620, if the sending relay does not receive a SOMack message, then the connection is terminated at 656 without a message being sent. If, at 620, a SOMack message is received from the receiver, then the sending relay starts sending the message content at 624 by sending a message segment (MSGSEG) message.

At 628, the sending relay checks to see if a higher priority message has been queued at the relay and if one has, the process continues at 616 with a transmittal of a SOM message for the higher priority message (which is followed by other message transmission phase processes 620, 624, and 628 or if appropriate, 656). In this manner, a higher priority message can interrupt the transmission of a lower priority message. If at 628 there is not a higher priority message queued, the process 600 continues with the sending relay checking for addition message segments at 632. If additional message segments are present, the transmittal step 624 and higher priority message step 628 are repeated until the entire message is transmitted. If, however, there are no additional message segments at 632 the sending relay acts to send an end of message (EOM) message.

If an EOM acknowledgment (EOMack) is received from the receiver at 640, the sending relay then looks for unsent lower priority messages at 644 that may have been earlier interrupted by the present message. If such a lower priority message exists, the next segment is sent at 624, i.e., the lower priority transmission is resumed without having to be restarted at the beginning. If an EOMack is not received at 640, then the transmission of the message is begun again (after a preset wait period) at 616 with the transmission of the SOM message. If no lower priority, interrupted messages are detected at 644, then the sending relay checks for additional messages at 648. If additional messages are queued at the relay, the next message is retrieved at 652 and transmission is begun at 616 with transmittal of a new SOM message. If no additional messages are queued, then connection is terminated at 656 after one or more messages have been sent. Additionally, message transmission can be terminated early according to the protocol by the sender transmitting an EOM message with the save being zero. Further, it should be noted that typically the last MSGSEG and EOM messages travel in the same underlying protocol segment (such as a TCP segment).

The protocol states for a receiving relay are based on passive acceptance of commands in messages and then verification of state. This can be thought of as a number of acceptable combinations of a first command followed by a new or second command which results in the receiving relay acting to verify a state and then, if appropriate, transmitting a reply command in a message. If an undefined or unanticipated command combination is received, then an error is detected and the connection is terminated by the receiving relay. The following is a listing according to the protocol of acceptable command combinations along with verification steps and appropriate replies.

After the communication process is started, a RID message is expected with the appropriate reply being to transmit an RIDack message after verifying the relay ID is registered with the receiving relay. The RID command can be followed by a SOM message or a SHUTDOWN message. If a SOM message is received, the relay acts to verify the transmitted priority and to send a SOMack message to the sender. A SHUTDOWN message results in orderly shutdown or connection termination without a reply. Continuing with the receiving states, the SOM message may be followed by either a MSGSEG message or an EOM message. The MSGSEG message results in reception and processing of message segments without a reply being transmitted, which, significantly, provides for time efficient message transmission as individual segments are not acknowledged. If an EOM message is received at this point, the message file is now empty and the receiving relay acts to transmit an EOMack message to the sender.

After the MSGSEG message, the receiving relay expects to receive another MSGSEG message which results in message reception with no reply. The MSGSEG message may also be followed by a SOM message indicating a higher priority message is interrupting the prior message. The receiving relay then verifies the received priority and verifies the message stack depth and replies with a SOMack message to the sender. The protocol also allows the MSGSEG message to be followed by an EOM message indicating the end of the current message. The receiving relay responds by verifying the message number and priority provided in the EOM message and verifying the message stack depth and transmits an EOMack message to the sender. After an EOM message is received, the protocol calls for either a SHUTDOWN or a SOM message to be received by the relay. The SHUTDOWN message results in orderly shutdown or termination of the connection while the SOM message results in verification of the priority provided in the SOM message and transmittal of a SOMack message to the sender.

From these defined transmitting and receiving state protocols, it can be seen that message transmittal generally requires a SOM message and an EOM message from sender to receiver, a SOMack message and an EOMack message from the receiver to the sender, and a number of MSGSEG messages from the sender to the receiver. The total number of messages per file or total message transfer between a sending and receiving relay is 4 messages or commands plus the number of message segments, which is significantly lower than the number that would be required if every message segment was acknowledged (i.e., 4 plus twice the number of message segments). In some cases, the total number of messages may be larger such as when a receiver encounters an error in saving the message during transmission, which may result in a number of message segments being transmitted prior to the receiving relay being able to provide a negative EOMack indicating the failure or error. Also, a message may in some cases be transferred twice, such as when the SOM, SOMack, MSGSEG, and EOM messages are all successfully transmitted but the EOMack is lost. Overall, the protocol results in time and space efficient transfer of messages between relays with priority-based interruption.

In another aspect, a system in accordance with the present invention may implement a one-time dynamic key binding registration process for registering one or more relays with the service provider system. In an exemplary embodiment, the system registers only the most downstream relay in any given customer system. By way of example, referring to customer system 130 in FIG. 1, only the customer relay 132, sometimes referred to as the "internet relay", need be registered. All upstream relays (i.e., forwarding relays 134, 138, and monitored relays 136, 140 are registered implicitly because the information they collect is funneled through the customer relay 132. This feature greatly simplifies the registration process, particularly for users installing large numbers of monitored relays in their customer systems.

In an exemplary embodiment, the one-time dynamic key binding registration process uses a shared secret key to register a relay with a service provider system. The shared secret key file may be generated by the service provider system and transmitted to the relay. The relay then uses the shared secret key file to authenticate itself during a registration process with the service provider system. Advantageously, the registration process ensures that reporting system data is accrued to the correct relay.

Figure 7:
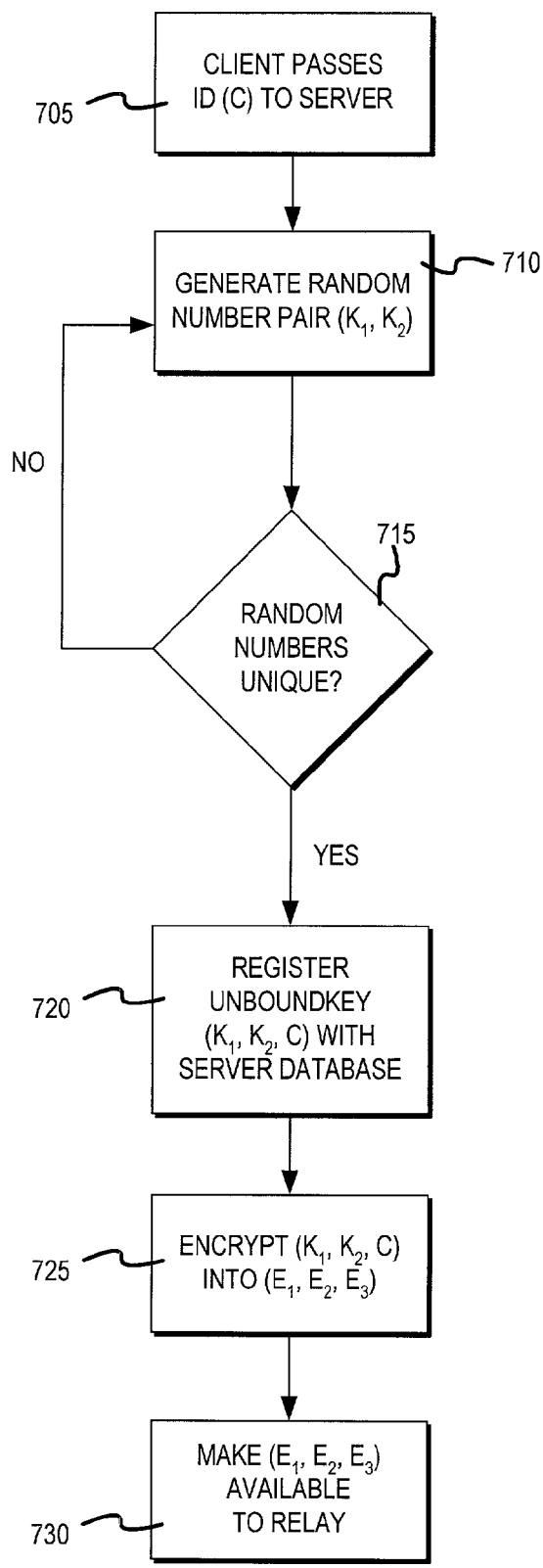
FIG. 7 is a flowchart that illustrates a process for generating a key file for a relay in accordance with aspects of the present invention.
Figure 8:
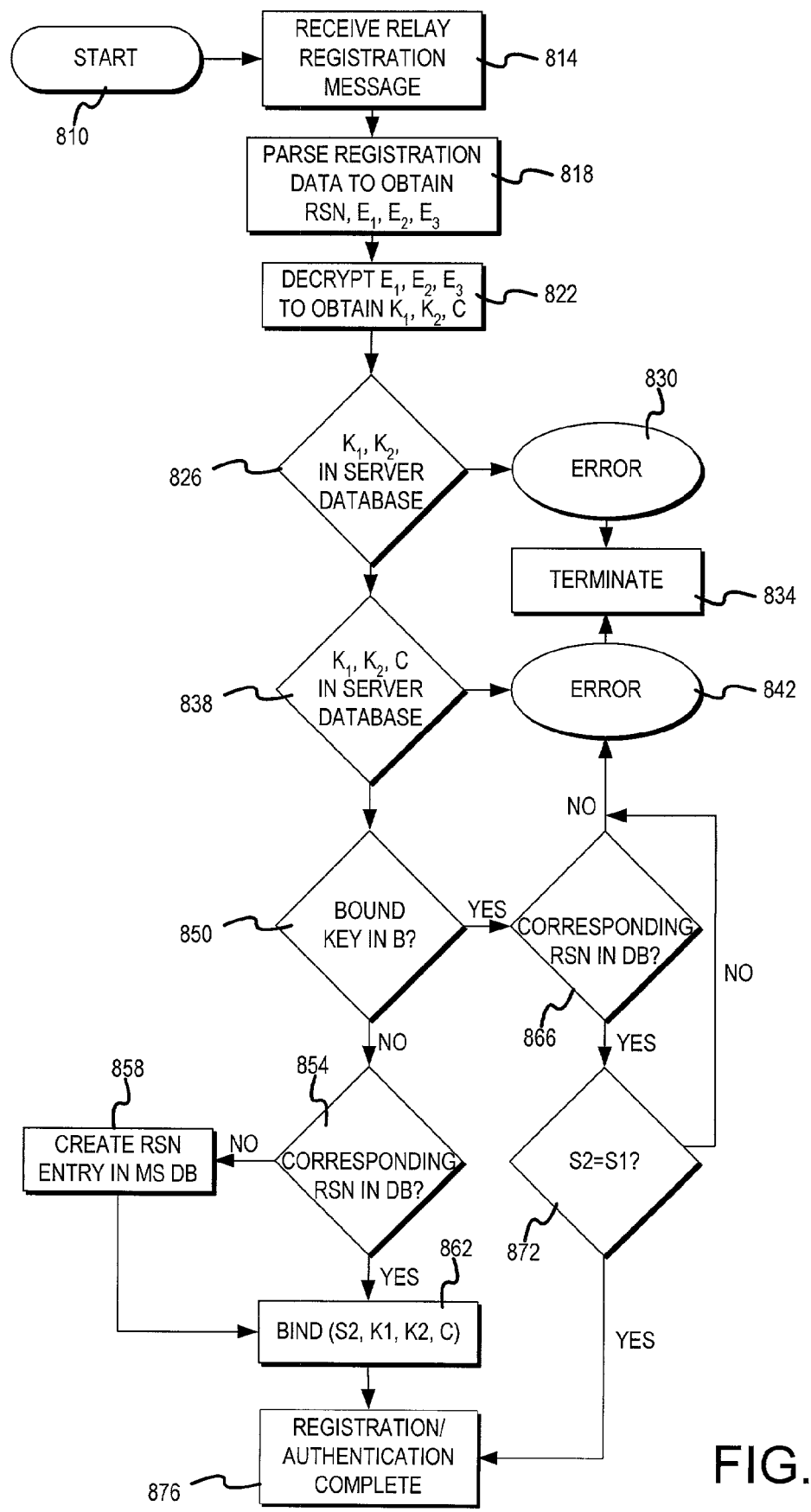
FIG. 8 is a flowchart that depicts an exemplary relay registration process in accordance with aspects of the present invention.

FIGS. 7–8 are flowcharts illustrating operational aspects of an exemplary storage system. In the following description, it will be understood that each block of the flowchart illustrations, and combinations of blocks in the flowchart illustrations, can be implemented by logic instructions. These logic instructions may be loaded onto a computer or other programmable apparatus to produce a machine, such that the logic instructions executable on the computer or other programmable apparatus create a machine for implementing the functions specified in the flowchart block or blocks. In an exemplary embodiment, the computer program instructions may be executed on one or more processors in a customer system and/or a service provider system.

These logic instructions may also be stored in a computer-readable memory that can direct a computer or other programmable apparatus to function in a particular manner. The logic instructions stored in the computer-readable memory produce an article of manufacture including instruction means or computer program product that implement the function specified in the flowchart block or blocks. The logic instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As used herein, the term "key" refers to a data set which may comprise four distinct data elements: a first key value (K1), a second key value (K2), a unique client identifier (C), and a unique system identifier (S). In the practice of the registration process, the combination of K1 and K2 must be unique across all keys assigned by the process. An unbound key refers to a data set consisting of (K1, K2, C). A bound key refers to a data set consisting of (K1, K2, C, S). Key files may be generated by a suitable computer (e.g., a server) within the service provider system. The server may maintain a database or data table comprising key files for each of the relays registered with the service provider system.

FIG. 7 is a flowchart that illustrates a process for generating a key file for a relay. This process may be initiated when a relay (referred to as a client) in a customer system seeks to obtain a key file to register with the service provider system. At step 705 the client requests a key file from the service provider system. A unique client identifier C is assigned to the client when the client account is created. The client identifier may be stored in a database associated with the service provider system.

At step 710, the server generates two random numbers. Random number generators are known in the art. In an exemplary embodiment, the random numbers are between 0 and 65,536. At step 715 the server executes logic instructions to determine whether the random numbers are unique. In an exemplary embodiment, the random numbers are compared to other key pairs K1, K2 registered in the database of key files. If the random number pair generated in step 710 is not unique, then control passes back to step 710, and a new random number pair is generated. By contrast, if the random number pair is unique, then at step 720 the unbound key (K1, K2, C) is registered in the database.

At step 725 the constituents of the unbound key (K1, K2, C) are encrypted into an encrypted data set (E1, E2, E3). The particular form of encryption implemented is not critical to the present invention. In an exemplary embodiment, the unbound key set (K1, K2, C) are encrypted using a conventional form of encryption, e.g., DES, RSA, etc. The encrypted data set is written to a file that is made accessible to the client through a secure download (step 730). By way of example, a file for an encrypted data set (E1, E2, E3) representative of an unbound key (K1, K2, C) may be structured as follows:

Name: myhost
Generated on: Mar. 20, 2002 12:50:16 PM EST
key1=01147054233221220443323879330764
key2=01818826889208713336339474561054
key3=01084551883108101408666674361210

The first two lines of the file are comment lines and will be ignored by any processes parsing the key file information. It will be noted that key1 and key2 need not correspond to the values of K1 and K2 in the unbound key set (i.e., there need not be a one-to-one relationship between the elements in the unbound key set and the corresponding encrypted data set). Further, key3 need not correspond to C. By way of example, the tuple (K1, K2, C) may be encrypted, then encrypted elements may be rearranged to form key1, key2, and key3.

The encrypted data set representative of the unbound key file may then be associated with the relay requesting registration. In an exemplary embodiment of the invention in which the relays operate on computers executing the UNIX operating system, this may be performed by executing a series of scripts that install the key file into the directory tree structure at /etc/opt/SUNWnc/keyfile. The presence of the key file is defined by modifying the /etc/opt/SUNWnc/relay.cfg file as follows:

Sender.auth=type1
Sender.auth.data=/etc/opt/SUNWnc/keyfile

The 'type1' entry indicates that the relay is to be identified using the one time dynamic key binding method described herein.

FIG. 8 is a flowchart that depicts an exemplary relay registration process. When a relay is invoked, the relay examines the contents of the /etc/opt/SUNWnc/relay.cfg file. If the "sender.auth" value is type1 (see above), then the relay appends the contents of the key file to the registration data. In an exemplary embodiment, the value associated with "sender.auth.data" is the name of the relay key file. The contents of the relay key file are appended to the relay registration message. The registration data includes the relay serial number (RSN) for this relay process, which is automatically generated and uniquely identifies each instance of a monitored system as per the database model. At step 814, the service provider system receives the relay registration message, which may be transmitted by the relay using a secure connection.

When the service provider system 110 receives the registration data message, the message is parsed to obtain the RSN, and the values of E1, E2, and E3 (step 818), which are decrypted to obtain the values of K1, K2, and C (step 822). The values of K1 and K2 are compared to key values registered in the database (step 826). If there is no match for K1 and K2 in the database, then an error condition is invoked (step 830) and the registration process is terminated (step 834).

By contrast, if there is a match then control passes to step 838, at which the data set (K1, K2, C) is compared to entries in the database to determine whether there is a matching entry in the database. If there is no matching entry, then an error routine is invoked (step 842) and the registration process is terminated (step 834).

If there is a matching entry in the database for the data set (K1, K2, C), which indicates that key values K1, K2 are associated with the correct client identifier, then control passes to step 850, and the database is queried to determine whether there is a corresponding bound key in the client relay authentication table database, i.e., whether there is a system identifier (S1) in the client relay identification table associated with the data set (K1, K2, C) (step 850).

If at step 850 there is not a matching entry in the client relay identification table, then the key is not bound, and a second query is conducted to determine whether there is a corresponding RSN in the monitored system table (step 854). This may be performed by searching the monitored system table using the RSN as an index to determine whether there is a matching entry. If there is not a corresponding RSN entry in the monitored system table, then an entry in the monitored system table is created for the RSN (step 858) and the entry is bound to the system identifier (step 862), e.g., by creating an entry of (S2, K1, K2, C) in the client relay authentication table. By contrast if there is a corresponding RSN entry in the monitored system table, then control passes directly to step 862, where the entry is bound to the system identifier.

If at step 850 the key is bound, then a second query is conducted to determine whether there is a corresponding RSN in the monitored system table (step 866). This may be performed by searching the monitored system table using the RSN as an index to determine whether there is a matching entry. If there is no match, then an error routine is invoked (step 842) and the registration process is terminated (step 834). By contrast, if there is a match, then the system identifier (S2) associated with the RSN is compared with the system identifier (S1) from the client relay authentication table (step 872). If S2 does not match S1, then an error routine is invoked (step 842) and the registration/authentication process is terminated (step 834). By contrast, if S1 and S2 match, then registration authentication is complete (step 876).

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

What is claimed is:

1. A computer implemented method for authenticating a relay with a service provide system using an encrypted key file, comprising:
   generating the encrypted key file wherein generating comprises the steps of;
      receiving an identifier associated with the relay;
      generating a registration key data set;
      recording the registration key data set in a database;
      encrypting the registration key data set forming an encrypted registration key data set; and
      making the encrypted registration key data set available to the relay as the encrypted key file;
   transmitting the encrypted key file from the relay to the service provider system when the relay is instantiated;
   transmitting the identifier that identifies the relay with the encrypted key file;
   decrypting the encrypted key file received at the service provider system to derive a first random number and a second random number;
   searching the database to determine whether there is an unbound key data set matching the first random number, the second random number, and the identifier associated with the relay;
   responsive to determining that the database fails to include the unbound key data set matching the first random number, the second random number, and the identifier associated with the relay, terminating authentication of the relay with the service provider; and
   responsive to determining that the database includes the unbound key data set matching the first random number, the second random number, and the identifier associated with the relay, searching the database to determine whether there is a bound key data set matching the first random number, the second random number, and the identifier associated with a relay, wherein when the bound key data set match is present in the database, authenticating the relay with the service provider system.

2. The method of claim 1, wherein generating a registration key data set includes generating the first random number and the second random number.

3. The method of claim 2, further comprising determining whether the first random number and the second random number are unique.

4. The method of claim 3, wherein the first random number and second random number are compared with corresponding values in the database to determine whether the first random number and the second random number are unique.

5. The method of claim 3, wherein if the first random number and second random number are not unique, then generating a new first random number and second random number.

6. The method of claim 1, wherein the encrypted registration key data set is made available to the relay via a secure internet connection.

7. At least one computer-readable memory containing a computer program product for use in connection with a processor for authenticating a relay with a service provider system using an encrypted key file, the computer program product comprising:
   program code for generating the encrypted key file wherein generating comprises the steps of;
      receiving an identifier associated with the relay;
      generating a registration key data set;
      recording the registration key data set in a database;
      encrypting the registration key data set forming an encrypted registration key data set; and
      making the encrypted registration key data set available to the relay as the encrypted key file;
   program code for transmitting the encrypted key file from the relay to the service provider system when the relay is instantiated;
   program code for transmitting the identifier that identifies the relay with the encrypted key file;
   program code for decrypting the encrypted key file received at the service provider system to derive a first random number and a second random number; and
   program code for searching the database to determine whether there is an unbound key data set matching the first random number, the second random number, and the identifier associated with the relay;
   responsive to determining that the database fails to include the unbound key data set matching the first random number, the second random number, and the identifier associated with the relay, program code for terminating authentication of the relay with the service provider; and
   responsive to determining that the database includes the unbound key data set matching the first random number, the second random number, and the identifier associated with the relay, program code for searching the database to determine whether there is a bound key data set matching the first random number, the second random number, and the identifier associated with a relay, wherein when the bound key data set match is present in the database, authenticating the relay with the service provider system.

* * * * *

UNITED STATES PATENT AND TRADEMARK OFFICE
CERTIFICATE OF CORRECTION

PATENT NO. : 7,149,898 B2 Page 1 of 1
APPLICATION NO. : 10/184608
DATED : December 12, 2006
INVENTOR(S) : Richard Marejka and David Haynes It is certified that error appears in the above-identified patent and that said Letters Patent is hereby corrected as shown below:

Column 21, line 46, "provide" should be --provider--

Signed and Sealed this

Thirteenth Day of March, 2007

JON W. DUDAS
*Director of the United States Patent and Trademark Office*